US011881648B2

(12) United States Patent
Nakai

(10) Patent No.: US 11,881,648 B2
(45) Date of Patent: Jan. 23, 2024

(54) CONNECTOR

(71) Applicant: SUMITOMO WIRING SYSTEMS, LTD., Mie (JP)

(72) Inventor: Kazuo Nakai, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 61 days.

(21) Appl. No.: 17/574,183

(22) Filed: Jan. 12, 2022

(65) Prior Publication Data

US 2022/0239029 A1 Jul. 28, 2022

(30) Foreign Application Priority Data

Jan. 25, 2021 (JP) ................................ 2021-009349

(51) Int. Cl.

| | |
|---|---|
| ***H01R 13/405*** | (2006.01) |
| ***H01R 13/11*** | (2006.01) |
| ***H01R 13/52*** | (2006.01) |
| ***H01R 13/639*** | (2006.01) |
| ***H01R 13/05*** | (2006.01) |

(52) U.S. Cl.

CPC ........... *H01R 13/405* (2013.01); *H01R 13/05* (2013.01); *H01R 13/11* (2013.01); *H01R 13/5202* (2013.01); *H01R 13/639* (2013.01)

(58) Field of Classification Search

CPC ...... H01R 13/405; H01R 13/05; H01R 13/11; H01R 13/5202; H01R 13/639

USPC .......................................................... 439/660

See application file for complete search history.

(56) References Cited

U.S. PATENT DOCUMENTS

| | | | | |
|---|---|---|---|---|
| 6,341,984 B1 * | 1/2002 | Murakami | H01R 13/5208 | 439/587 |
| 9,099,803 B2 * | 8/2015 | Omori | H01R 13/521 | |
| 9,318,827 B2 * | 4/2016 | Osada | H01R 13/4223 | |
| 2011/0287647 A1 * | 11/2011 | Tamagawa | H01R 13/5213 | 439/147 |
| 2019/0363473 A1 * | 11/2019 | Jin | H01R 13/11 | |
| 2020/0176917 A1 * | 6/2020 | Zhou | H01R 13/432 | |
| 2020/0328556 A1 * | 10/2020 | Takeuchi | H02G 15/16 | |
| 2020/0403346 A1 * | 12/2020 | Jove Albos | H01R 13/6273 | |
| 2022/0052478 A1 * | 2/2022 | Masuda | H01R 13/629 | |
| 2022/0158384 A1 * | 5/2022 | Masuda | H01R 13/42 | |
| 2023/0117463 A1 * | 4/2023 | Yamanashi | H01R 13/639 | 439/752 |
| 2023/0125720 A1 * | 4/2023 | Nakamura | H01R 13/64 | 439/350 |

FOREIGN PATENT DOCUMENTS

JP 2014-035947 A 2/2014

* cited by examiner

*Primary Examiner* — Alexander Gilman

(74) *Attorney, Agent, or Firm* — Venjuris, P.C.

(57) ABSTRACT

A connector 10, 10A includes a male terminal 50, 50A including a tab 52, 52A, a female terminal 70 connectable to the tab 52, 52A, and a housing 20, 20A. The housing 20, 20A includes a holding portion 22 for holding the male terminal 50, 50A and a cavity 23 for accommodating the female terminal 70. One end of the cavity 23 is closed by a wall surface 32 of the holding portion 22. The tab 52, 52A is arranged to project into the cavity 23 from the wall surface 32 of the holding portion 22.

4 Claims, 12 Drawing Sheets

CONNECTOR

CROSS-REFERENCE TO RELATED APPLICATIONS

This application is based on and claims priority from Japanese Patent Application No. 2021-009349, filed on Jan. 25, 2021, with the Japan Patent Office, the disclosure of which is incorporated herein in its entirety by reference.

TECHNICAL FIELD

The present disclosure relates to a connector.

BACKGROUND

A connector disclosed in Japanese Patent Laid-open Publication No. 2010-177045 includes a housing having terminal inserting portions and a conductor holding portion, terminals to be inserted into the terminal inserting portions, a connection conductor to be held in the conductor holding portion, and a lid member to be mounted on the housing. The connection conductor includes a plurality of fitting portions and a coupling portion coupling the respective fitting portions. Each fitting portion is connected to a female electrical contact portion of the terminal.

A connector disclosed in Japanese Patent Laid-open Publication No. 2014-035947 includes a male housing and a female housing connectable to each other. The male housing holds a male terminal (joint terminal). The female housing includes terminal accommodation chambers for accommodating female terminals. The joint terminal includes a plurality of contact portions and a coupling portion coupling the respective contact portions. Each contact portion is connected to a contact spring piece of the female terminal.

SUMMARY

In the case of Japanese Patent Laid-open Publication No. 2010-177045, the terminal is inserted into the terminal inserting portion and stopped in contact with the coupling portion of the connection conductor. An insertion force is applied to the connection conductor in a direction in which the connection conductor comes out from the housing. Thus, the presence of the lid member for restricting the escape of the connection conductor is indispensable.

In the case of Japanese Patent Laid-open Publication No. 2014-035947, the female terminal is inserted into the terminal accommodation chamber and stopped in contact with the front wall of the female housing. Thus, both the male housing and female housing are necessary. However, if one of the both housings can be omitted, the number of components can be reduced, which is preferable.

Accordingly, the present disclosure aims to provide a connector capable of reducing the number of components.

The present disclosure is directed to a connector with a male terminal including a tab, a female terminal connectable to the tab, and a housing, wherein the housing includes a holding portion for holding the male terminal and a cavity for accommodating the female terminal, one end of the cavity is closed by a wall surface of the holding portion, and the tab is arranged to project into the cavity from the wall surface of the holding portion.

According to the present disclosure, it is possible to provide a connector capable of reducing the number of components.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
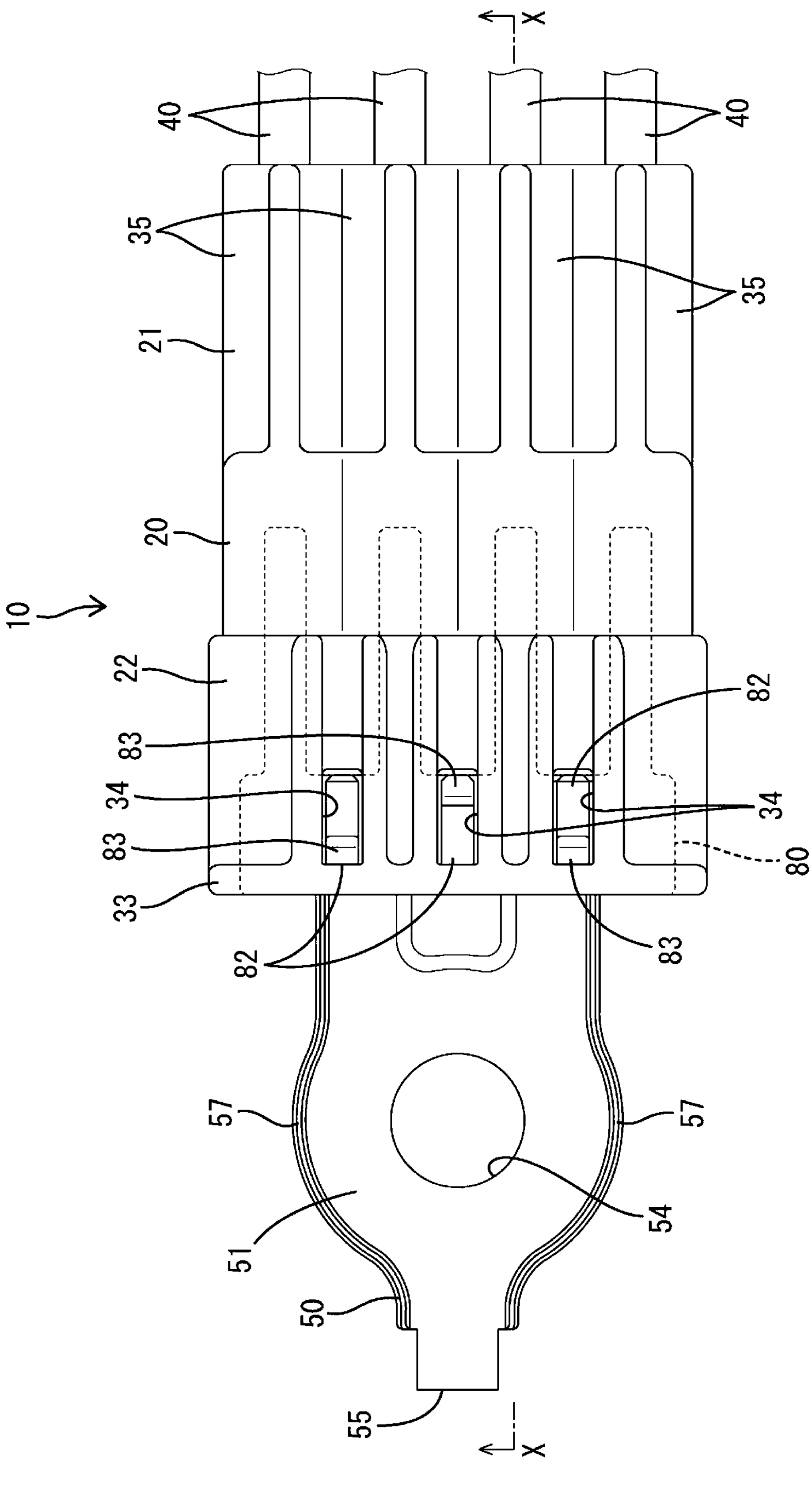
FIG. 1 is a plan view of a connector according to a first embodiment of the present disclosure when a retainer is at a full locking position.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

(1) The connector of the present disclosure is provided with a male terminal including a tab, a female terminal connectable to the tab, and a housing, wherein the housing includes a holding portion for holding the male terminal and a cavity for accommodating the female terminal, one end of the cavity is closed by a wall surface of the holding portion, and the tab is arranged to project into the cavity from the wall surface of the holding portion.

With the male terminal held in the holding portion, the female terminal is inserted into the cavity. The female terminal is stopped in contact with the wall surface of the holding portion and connected to the tab of the male terminal. The holding portion for holding the male terminal and the cavity for accommodating the female terminal are provided in the common housing without being separately provided in a male housing and a female housing. Thus, the number of components can be reduced.

Further, by stopping the female terminal in contact with the wall surface of the holding portion, the direct application of an insertion force of the female terminal to the male terminal can be avoided. Thus, it is not necessary to provide a special structure for restricting the escape of the male terminal, separately from the housing.

(2) Preferably, the male terminal is held in the holding portion by insert molding.

According to this, the integrity of the male terminal and the holding portion can be enhanced and the wall surface of the holding portion can be accurately formed into such a shape that the female terminal can be stopped in contact therewith.

(3) The housing may include a locking lance projecting into the cavity to lock the female terminal and an opening penetrating from an outer surface of the housing to a position facing the locking lance, and a plug portion may be arranged in the opening.

The housing is formed with the opening due to the removal of a mold for forming the locking lance. If the opening is formed, there is a possibility that an external matter enters the cavity through the opening from the outer surface of the housing. However, according to the above configuration, the entrance of the external matter into the cavity can be prevented by the plug portion.

(4) A sealing portion may be provided which seals between the plug portion and the opening.

According to this, the entrance of water, oil and the like into the cavity through the opening can be prevented.

(5) The plug portion may be provided on a retainer for restricting deflection of the locking lance.

According to this, since the plug portion has a retainer function, the plug portion needs not be a dedicated component and is excellent in versatility.

Details of Embodiment of Present Disclosure

Specific examples of connectors according to embodiments of the present disclosure are described below with reference to the drawings. Note that the present invention is not limited to this illustration and is intended to be represented by claims and include all changes in the scope of claims and in the meaning and scope of equivalents.

First Embodiment

Figure 2:
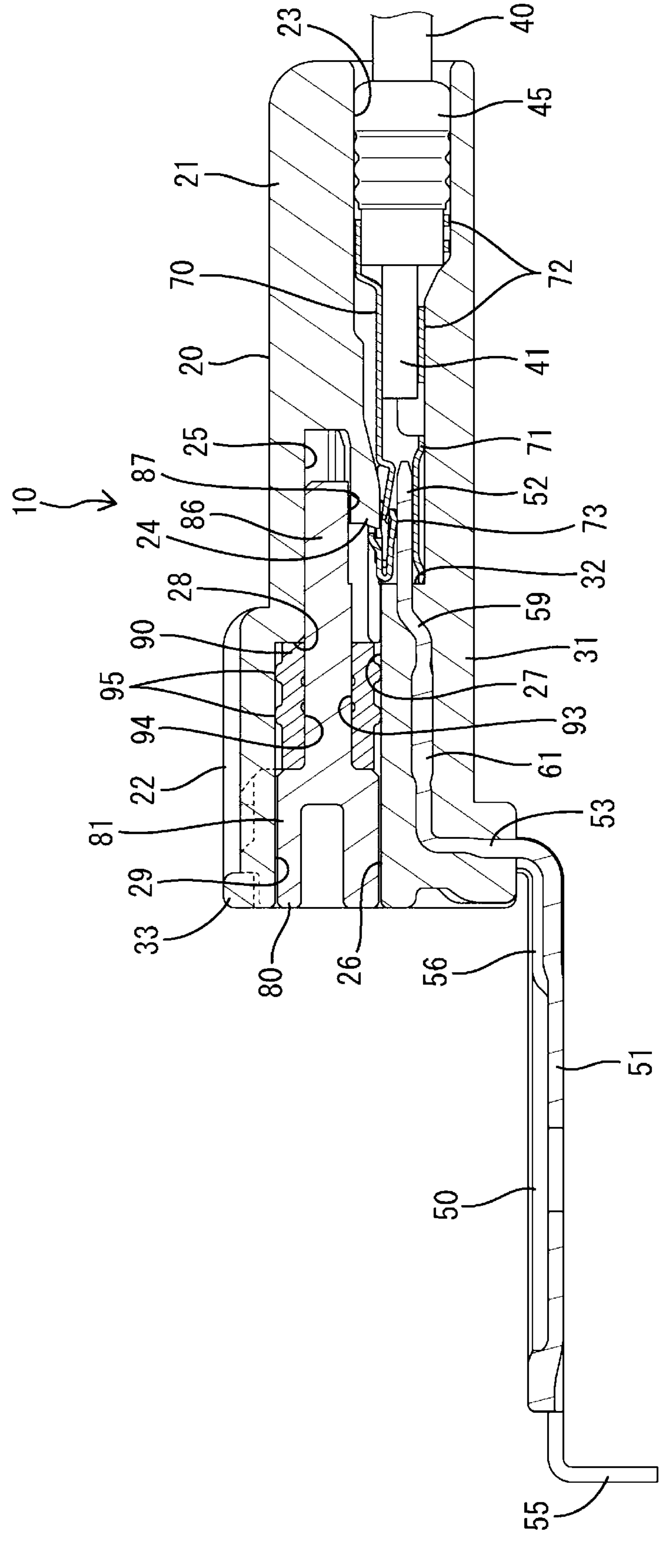
FIG. 2 is a section along X-X of FIG. 1.
Figure 4:
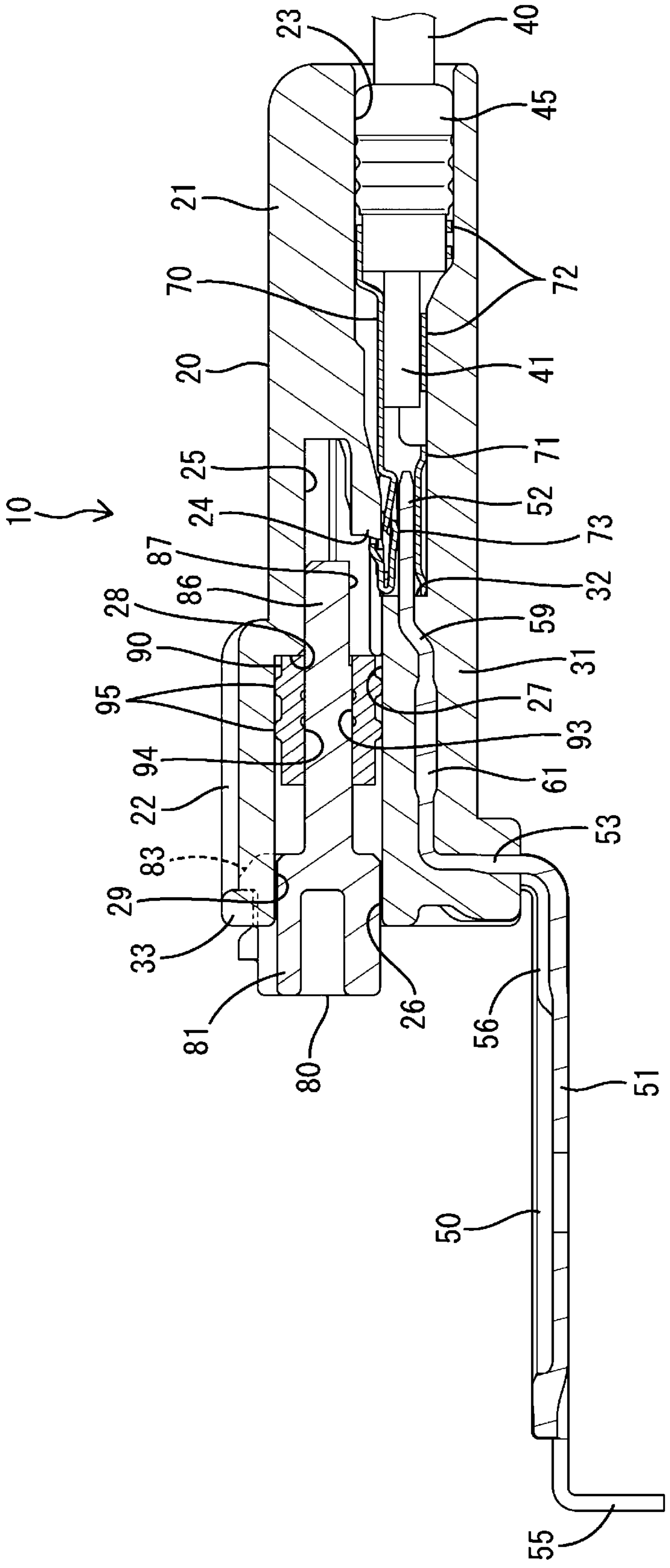
FIG. 4 is a section along Y-Y of FIG. 3.

A connector 10 according to a first embodiment includes, as shown in FIGS. 2 and 4, a housing 20, a male terminal 50, female terminals 70, a retainer 80 and a sealing member 90. The male terminal 50 is integrally held in the housing 20 by insert molding. The female terminals 70 are accommodated into the housing 20. The male terminal 50 and the female terminals 70 are connected to each other in the housing 20. The housing 20 is completed as a single housing and not divided into a male housing and a female housing. The retainer 80 is mounted into the housing 20 to restrict the escape of the female terminals 70 from the housing 20.

Note that, in the following description, a right side of FIGS. 1 to 4 is referred to as a front side concerning a front-rear direction. A vertical direction is synonymous with a height direction and based on a vertical direction of FIGS. 2 and 4. A lateral direction is synonymous with a width direction and based on a lateral direction of FIGS. 5, 6 and 8. Note that these direction references do not necessarily coincide with directions in an actually used state.

(Housing)

The housing 20 is made of synthetic resin and includes an accommodating portion 21 for accommodating the female terminals 70 in a front part and a holding portion 22 for holding the male terminal 50 in a rear part. The accommodating portion 21 and the holding portion 22 are arranged one after the other in the front-rear direction.

Figure 5:
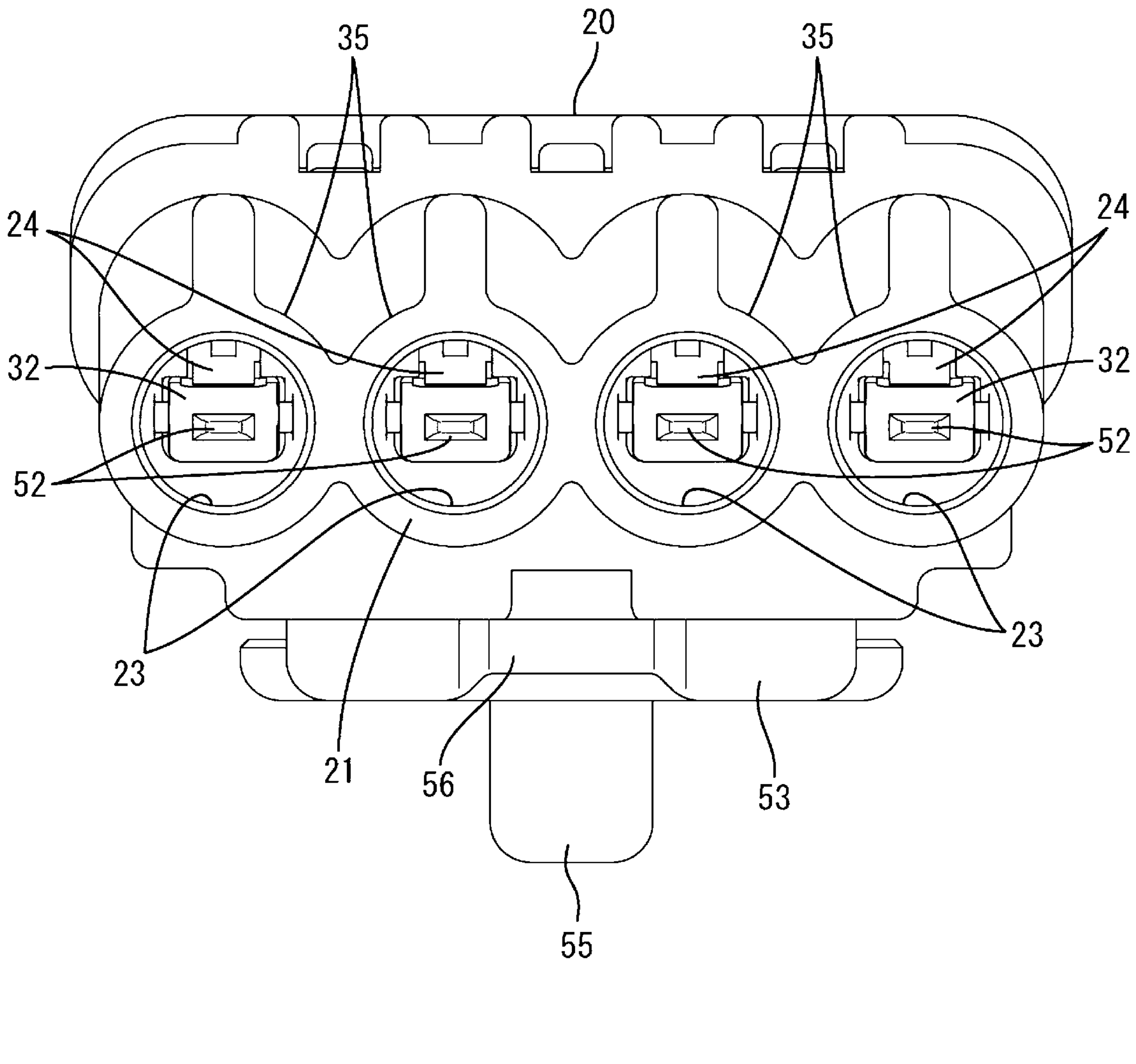
FIG. 5 is a front view of a housing having a male terminal inserted therein.

As shown in FIG. 5, the accommodating portion 21 includes a plurality of cavities 23 arranged in a row in the lateral direction. A front part of each cavity 23 has a circular cross-section and provided to extend in the front-rear direction in a hollow cylindrical portion 35. As shown in FIGS. 2 and 4, the front end of the cavity 23 is open in the front surface of the accommodating portion 21 (housing 20), and the rear end of the cavity 23 is closed by a later-described wall surface 32 of the holding portion 22. The accommodating portion 21 includes locking lances 24 projecting into the respective cavities 23. The locking lance 24 is cantilevered rearward from the upper surface of the inner wall of the cavity 23 and is deflectable and deformable in the vertical direction. The accommodating portion 21 includes deflection spaces 25 for allowing the deflection of the locking lances 24 above the locking lances 24.

Figure 6:
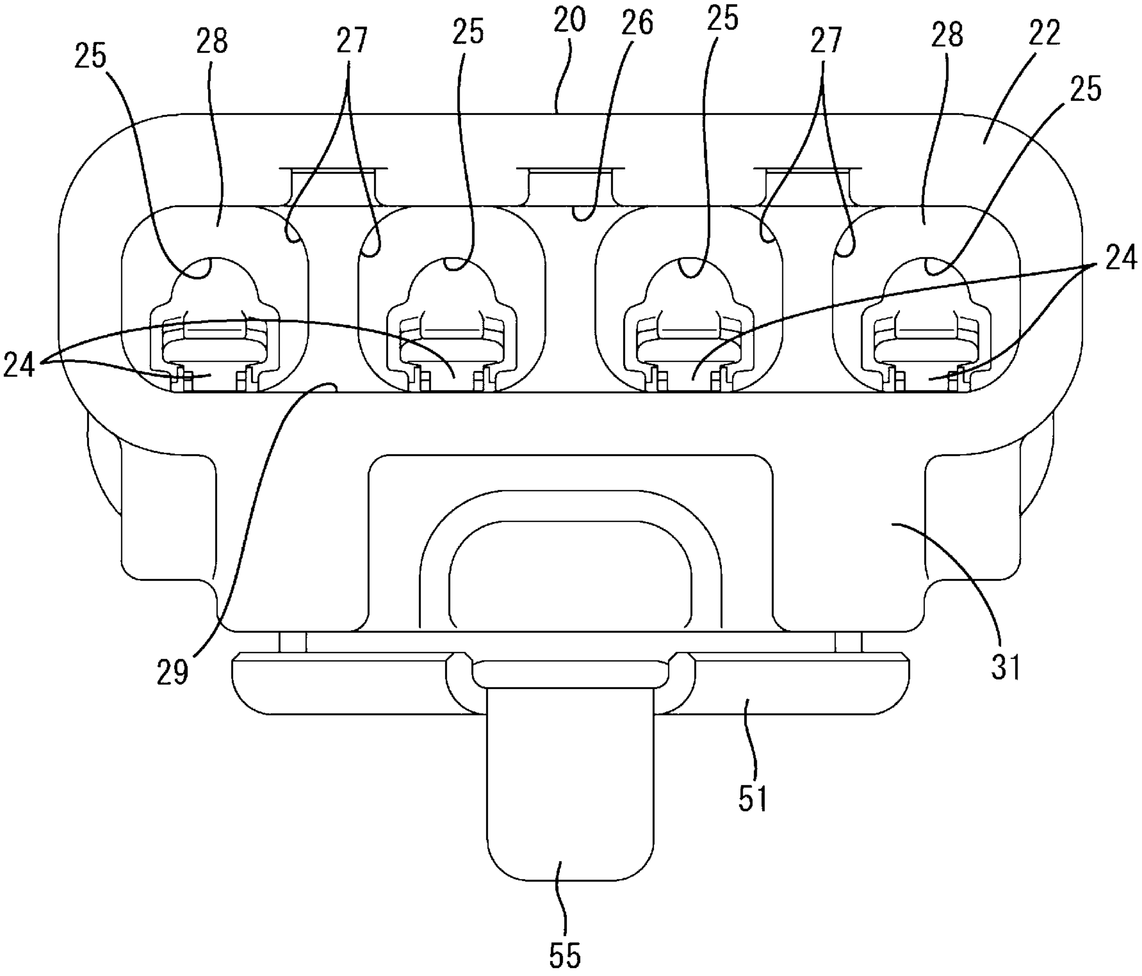
FIG. 6 is a back view of the housing having the male terminal inserted therein.

The housing 20 includes, in an upper part, an opening 26 communicating with the deflection spaces 25, extending in the front-rear direction and open in the rear surface of the holding portion 22. As shown in FIG. 6, the opening 26 includes a plurality of sealing spaces 27 corresponding to the respective deflection spaces 25 and provided side by side in the lateral direction. As shown in FIGS. 2 and 4, a step surface 28 extending along the vertical direction is provided at an intermediate position in the front-rear direction on the inner upper surface of the opening 26. Out of spaces of the opening 26 on both front and rear sides across the step surface 28, the rear space is open larger in the vertical direction than the front space. The sealing spaces 27 are provided in the aforementioned rear space in the opening 26. Later-described plug portions 86 of the retainer 80 and later-described sealing portions 91 of the sealing member 90 are inserted into the sealing spaces 27.

The opening 26 includes a body accommodation space 29 for accommodating a later-described retainer body 81 of the retainer 80 behind the respective sealing spaces 27 in the aforementioned rear space. As shown in FIG. 6, the body accommodation space 29 is a single space extending long in the lateral direction while communicating with the respective sealing spaces 27 on a front side.

The holding portion 22 includes a block-like holding portion body 31 in a lower part of the housing 20. As shown in FIGS. 2 and 4, the holding portion body 31 defines the lower surface of the opening 26 (sealing spaces 27 and body accommodation space 29). The male terminal 50 is held in the holding portion body 31 by insert molding. The front surface of the holding portion body 31 serves as the wall surface 32 extending along the vertical direction and lateral direction and closes the rear ends of the respective cavities 23. Later-described tables 52 of the male terminal 50 project into the cavities 23 from the front surface of the holding portion body 31.

Figure 3:
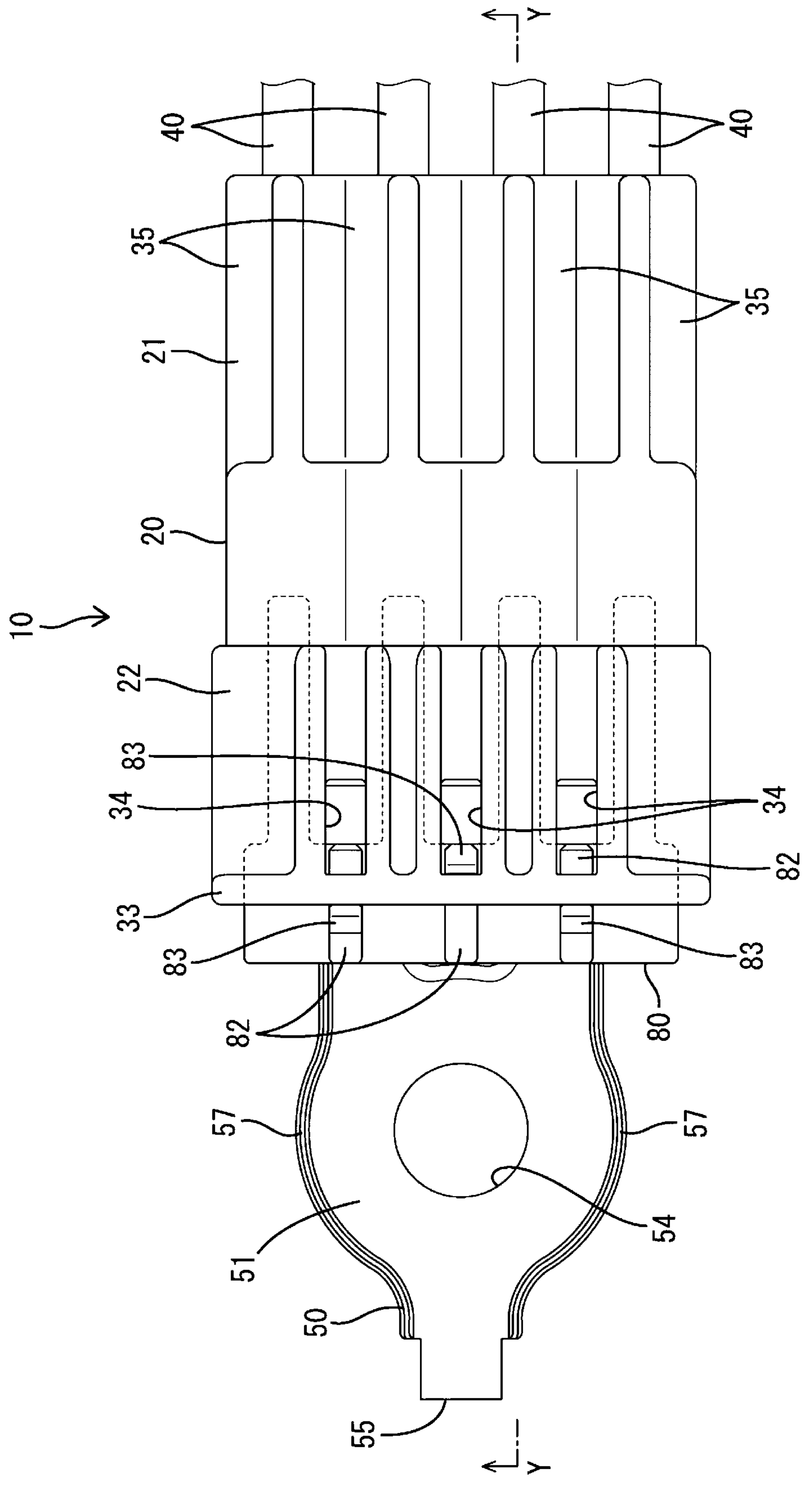
FIG. 3 is a plan view when the retainer is at a partial locking position.

As shown in FIGS. 1 and 3, the holding portion 22 includes a covering wall 23, which is the upper wall of the housing 20. The covering wall 33 defines the upper surface of the opening 26 (sealing spaces 27 and the body accommodation space 29). The covering wall 33 includes lock receiving portions 34 at a plurality of positions (three positions in the case of the first embodiment) spaced apart in the lateral direction. Each lock receiving portion 34 is a hole penetrating through the covering wall 33 in a thickness direction and has a rectangular opening shape long in the front-rear direction. Each lock receiving portion 34 communicates with the body accommodation space 29 of the opening 26 on a lower side. A projection 83 of a later-described locking portion 82 enters and is lockable to each lock receiving portion 34.

(Male Terminal 50)

Figure 7:
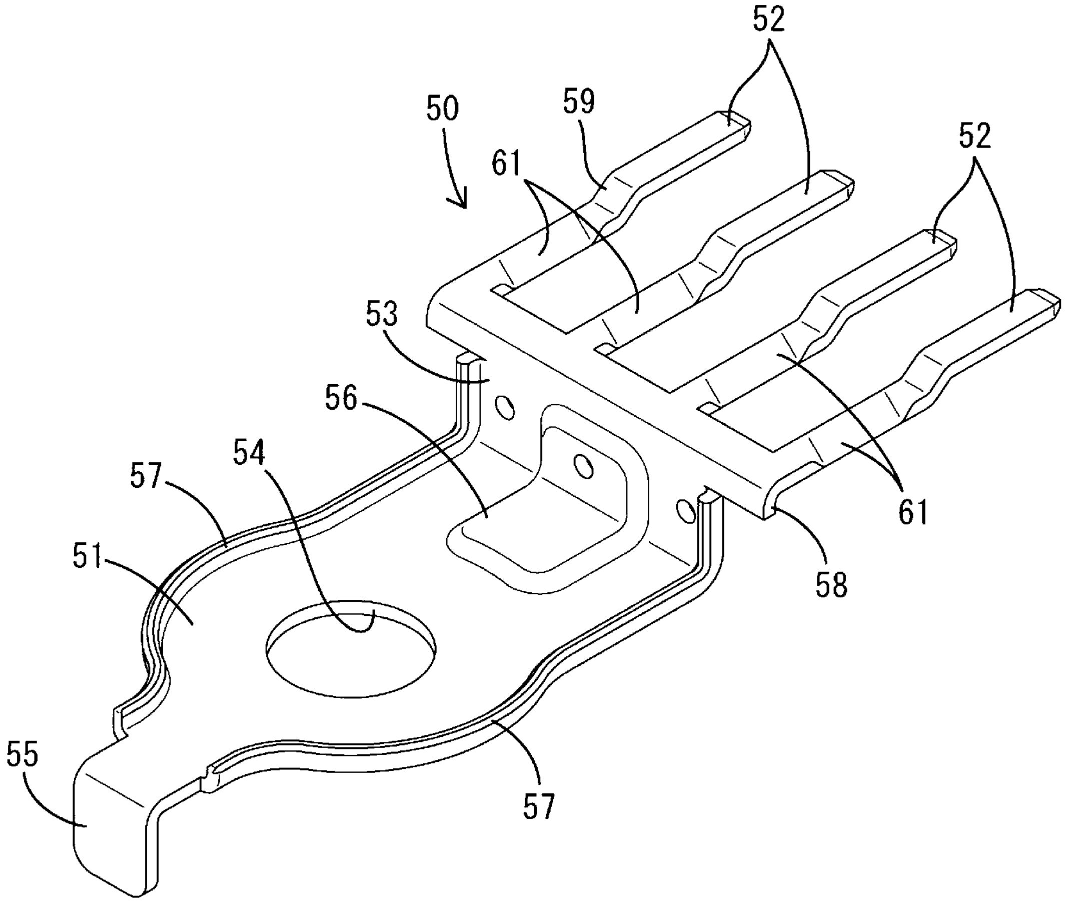
FIG. 7 is a perspective view of the male terminal.

The male terminal 50 is a busbar made of conductive metal and includes, as shown in FIG. 7, a mounting portion 51 in a rear part, a plurality of the tabs 52 in a front part and a linking portion 53 between the mounting portion 51 and the respective tabs 52.

The mounting portion 51 has a flat shaped extending along the front-rear direction and lateral direction and includes a circular mounting hole 54 penetrating in a plate thickness direction (vertical direction). Further, the male terminal 50 includes a hooking portion 55 bent downward from the rear end of the mounting portion 51. The male terminal 50 is mounted on an unillustrated mounting object (ground connection object) via a bolt or the like inserted through the mounting hole 54 with the hooking portion 55 hooked to an unillustrated hooked portion.

The linking portion 53 rises upward from the front end of the mounting portion 51. A flat bead portion 56 bulging upward is provided between the linking portion 53 and the mounting portion 51 in a laterally central part of the male terminal 50. Further, rib-like rising edge parts 57 extending from the linking portion 53 to the mounting portion 51 are provided on both left and right end parts of the male terminal 50. The bead portion 56 and the rising end parts 57 function to maintain the bent shape between the linking portion 53 and the mounting portion 51 in the male terminal 50.

The male terminal 50 also includes a coupling portion 58 L-shaped in a side view, protruding toward both left and right sides from the upper end of the linking portion 53 and bent forward.

The respective tabs 52 are in the form of plates having a rectangular cross-section, and project forward from the front edge of the coupling portion 58 while being arranged in a row in the lateral direction. Each tab 52 includes a step portion 59 at an intermediate position in a projecting direction (front-rear direction). Out of regions of each tab 52 on both left and right sides across the step portion 59, the front region is arranged slightly higher than the rear region.

Figure 8:
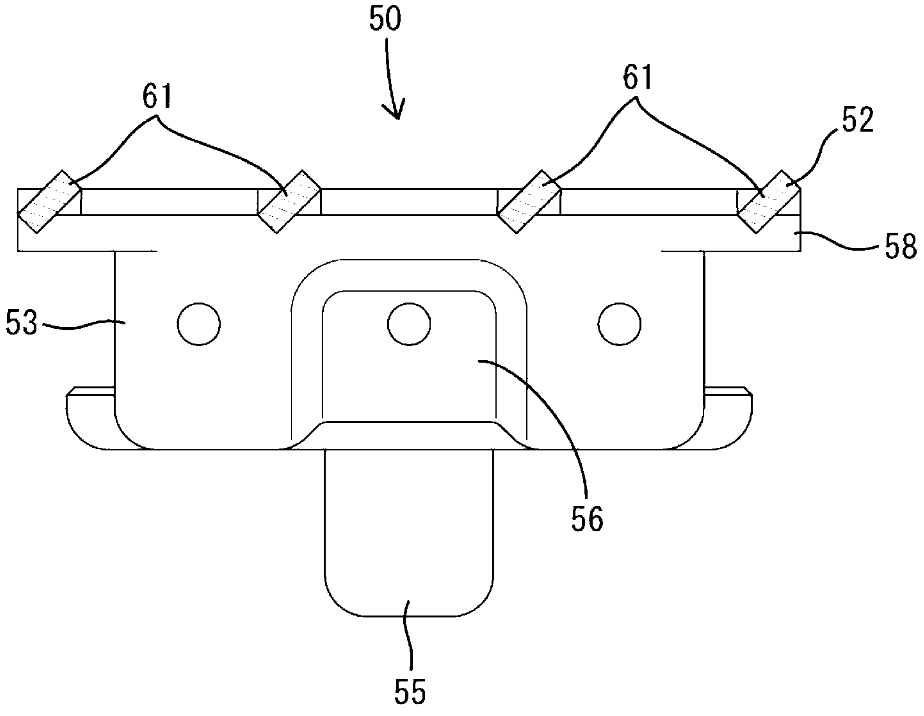
FIG. 8 is a front view when the male terminal is cut at twisted portions.

A twisted portion 61 is provided in the rear region of each tab 52 as shown in FIG. 8. The twisted portion 61 is shaped to be twisted in a range of 0° to 90° (45° in this embodiment) about an axis with respect to parts of the tab 52 other than the twisted portion 61.

As shown in FIG. 8, out of the outer surfaces of the twisted portion 61, the left side surface and upper surface are arranged to face leftward and the right side surface and lower surface are arranged to face rightward.

By interposing a coating material on an interface of the tab 52 and a resin part of the housing 20, sealability between the housing 20 and the tab 52 can be improved.

In the case of the first embodiment, the coating material is injected from both left and right sides or from both upper and lower sides of the tab 52. The coating material blown from the left or upper side is attached to the left side surface and upper surface of the twisted portion 61, and the coating material blown from the right or lower side is attached to the right side surface and lower surface of the twisted portion 61. As a result, the coating material can be efficiently attached to the entire periphery of the tab 52 by being injected from two directions opposing the tab 52. Further, a holding force of the male terminal 50 in the housing 20 can be enhanced by the twisted portions 61.

Note that, contrary to the case shown in FIG. 8, out of the outer surfaces of the twisted portion 61, the left side surface and lower surface may be arranged to face leftward and the right side surface and upper surface may be arranged to face rightward. Also in this case, the coating material injected from two directions opposing the tab 52 can be attached to the entire periphery of the tab 52 as in the above case.

(Female Terminals)

The female terminal 70 is made of conductive metal and includes, as shown in FIGS. 2 and 4, a tubular connecting portion 71 and a barrel portion 72 in the form of an open barrel provided in front of the connecting portion 71.

The barrel portion 72 is crimped to a core 41 in an end part of a wire 40 and electrically connected to the wire 40. Further, the barrel portion 72 is crimped to a rubber plug 45 fit on the end part of the wire 40. The rubber plug 45 is inserted into a front part of the cavity 23 and held in close contact with the inner peripheral surface of the cavity 23.

(Retainer)

Figure 9:
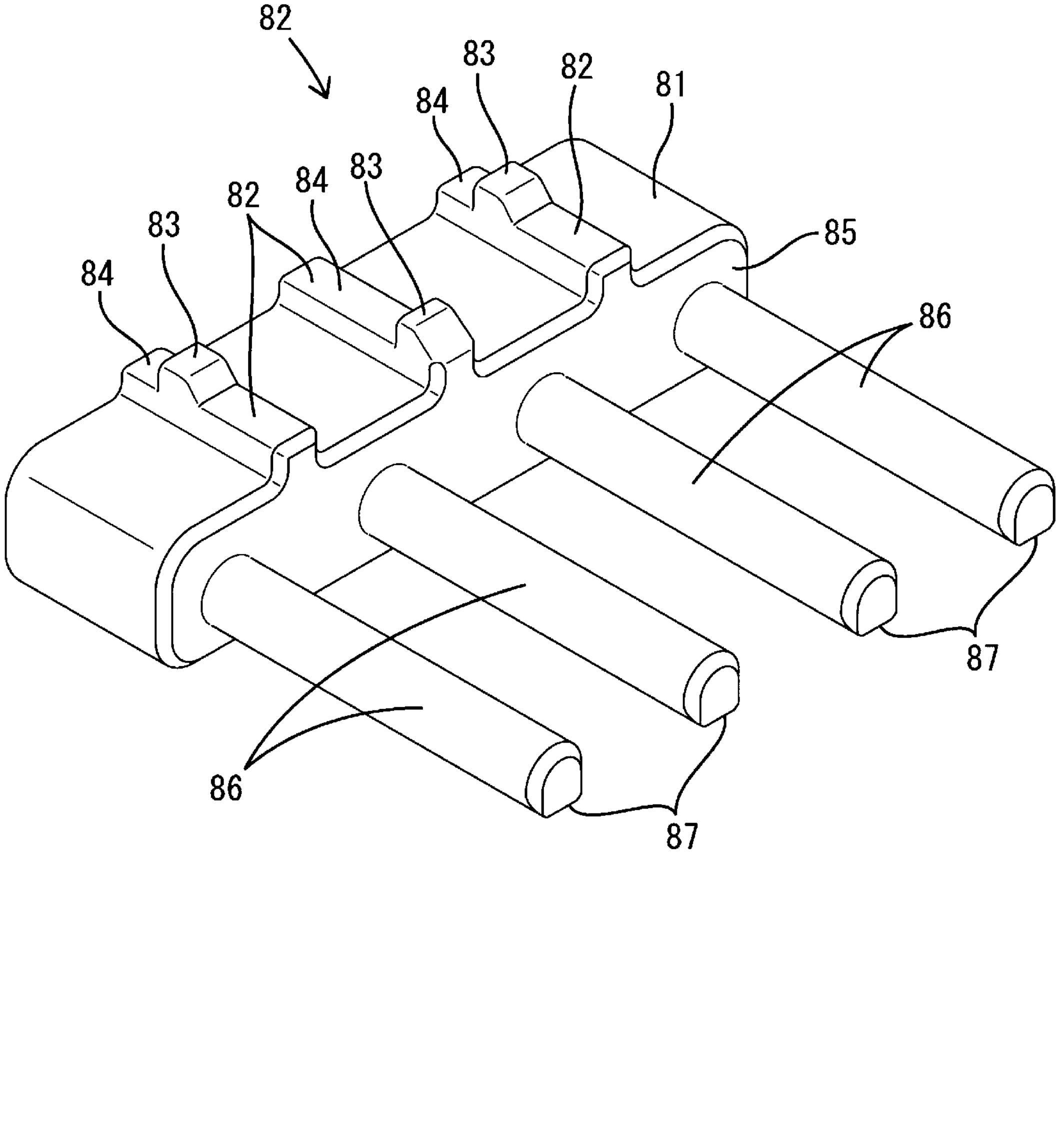
FIG. 9 is a perspective view of the retainer.

The retainer 80 is made of synthetic resin and includes, as shown in FIG. 9, a flat retainer body 81 long in the lateral direction.

The retainer body 81 includes locking portions 82 at a plurality of positions (three positions in the first embodiment) spaced apart in the lateral direction on an upper surface. Each locking portion 82 includes a claw-like projection 83 projecting upward from a rib-like portion 84 extending in the front-rear direction. Each of the locking portions 82 arranged on both left and right sides includes the projection 83 in a rear part of the rib-like portion 84. The locking portion 82 arranged on a laterally central side includes the projection 83 in a front end part of the rib-like portion 84. The retainer body 81 includes a flat front surface portion 85 extending in the vertical direction and lateral direction.

Further, the retainer 80 includes a plurality of the plug portions 86 elongated and projecting forward from the front surface portion 85. On the front surface of the retainer body 81, the respective plug portions 86 are arranged at positions corresponding to the respective sealing spaces 27 (respective cavities 23) while being spaced apart in the lateral direction. Each plug portion 86 has a cylindrical shape except a tip part. The tip part of each plug portion 86 has a flat restricting surface 87 capable of contacting the locking lance 24 on a lower surface.

(Sealing Member)

Figure 10:
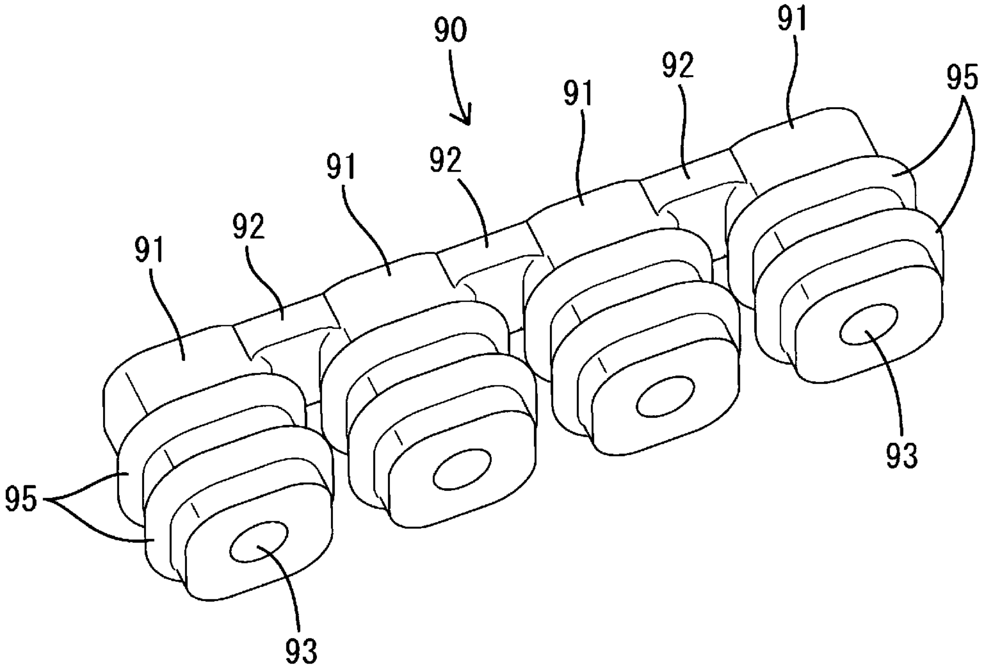
FIG. 10 is a perspective view of a sealing member.

The sealing member 90 is made of rubber such as silicon rubber and integrally formed and includes, as shown in FIG. 10, a plurality of the sealing portions 91 arranged in a row in the lateral direction and bridge portions 92 coupling the respective sealing portions 91 between rear end parts of the adjacent sealing portions 91. Each sealing portion 91 is in the form of a rectangular tube with four rounded corners and includes a sealing hole 93 penetrating in the front-rear direction and having a circular cross-section. As shown in FIGS. 2 and 4, a plurality of inner peripheral lips 94 are provided at intervals in the front-rear direction on the inner peripheral surface of the retainer sealing hole 93 of the sealing portion 91. The respective inner peripheral lips 94 are held in close contact with the outer peripheral surface of the plug portion 86 inserted into the sealing hole 93. A plurality of outer peripheral lips 95 are circumferentially provided at intervals in the front-rear direction on the outer peripheral surface of each sealing portion 91. The respective outer peripheral lips 95 are held in close contact with the inner peripheral surface of each sealing space 27 of the opening 26. In this way, each sealing space 27 of the opening 26 is maintained liquid tight.

(Overall Structure and Functions of Connector)

The male terminal 50 is insert-molded in the housing 20. In this way, the linking portion 53, the coupling portion 58, the rear regions of the tabs 52 including the twisted portion 61 and the step portions 59 are held in a state embedded in the holding portion body 31 (see FIGS. 2 and 4). The mounting portion 51 is arranged in a state projecting and exposed rearward from the lower part of the holding portion body 31. Tip parts (front regions) of the tabs 52 are arranged to project into the corresponding cavities 23.

The sealing portions 91 of the sealing member 90 are inserted into the sealing space 27 of the opening 26. The sealing portions 91 are stopped in contact with the step surface 28. The bridge portions 92 of the sealing member 90 are inserted into a front part of the body accommodation space 29 of the opening 26. Further, the plug portions 86 of the retainer 80 are passed through the sealing holes 93 of the sealing member 90 in a liquid-tight manner. Tip parts of the plug portions 86 are arranged to face the deflection spaces 25 from behind (see FIG. 4).

The retainer 80 is inserted into the body accommodation space 29 and left at a partial locking position with respect to the housing 20. As shown in FIG. 3, when the retainer 80 is at the partial locking position, the projection 83 of the locking portion 82 on the laterally central side is inserted into the lock receiving portion 34 of the covering wall 33 and the projections 83 of the respective locking portions 82 on both left and right sides are arranged behind the covering wall 33. At the partial locking position, the retainer 80 is restricted from moving rearward by the contact of the projection 83 of the locking portion 82 on the laterally central side with the rear edge of the lock receiving portion 34 and restricted from moving forward by the contact of the projections 83 of the respective locking portions 82 on both left and right sides with the rear end of the covering wall 33.

Further, when the retainer 80 is at the partial locking position, the female terminal 70 connected to the end part of the wire 40 is inserted into the cavity 23 of the accommodating portion 21 from front. In the process of inserting the female terminal 70, the locking lance 24 contacts the connecting portion 71 to be deflected and deformed into the deflection space 25. When the female terminal 70 is properly inserted into the cavity 23, the locking lance 24 resiliently returns to lock the connecting portion 71 and the female terminal 70 is primarily retained by the locking lance 24. Further, when the female terminal 70 is properly inserted into the cavity 23, the connecting portion 71 contacts the wall surface 32 of the holding portion body 31 as shown in FIG. 4, thereby restricting any further rearward movement of the female terminal 70. The rubber plug 45 is inserted in a liquid-tight manner in a rear part of the cavity 23.

Further, in the process of inserting the female terminal 70, the tip part of the tab 52 is inserted into the connecting portion 71 from front. When the female terminal 70 is properly inserted into the cavity 23, the tip part of the tab 52 contacts a resilient contact piece 73 provided in the connecting portion 71 and the both terminals 50, 70 are electrically connected as shown in FIG. 4. As just described, in the case of the first embodiment, the insertion of the female terminal 70 into the cavity 23 and the connection of the both terminals 50, 70 can be performed by one operation.

After the female terminals 70 are properly inserted into the cavities 23, the retainer 80 is pushed forward to move from the partial locking position to a full locking position. When the retainer 80 reaches the full locking position, the tip parts of the plug portions 86 enter the deflection spaces 25 and the restricting surfaces 87 of the plug portions 86 are arranged to contactably face the locking lances 24 from above as shown in FIG. 2. In this way, the deflection of the locking lances 24 is restricted, with the result that the female terminals 70 are secondarily retained. As shown in FIG. 1, when the retainer 80 is at the full locking position, any of the projections 83 of the respective locking portions 82 is inserted in the lock receiving portion 34 of the covering wall 33. At the full locking position, the retainer 80 is restricted from moving forward by the contact of the projection 83 of the locking portion 82 on the laterally central side with the front edge of the lock receiving portion 34 and restricted from moving rearward by the contact of the projections 83 of the respective locking portions 82 on both left and right sides with the rear edges of the lock receiving portions 34. In contrast, if the female terminal 70 is left incompletely inserted without being properly inserted into the cavity 23, the tip part of the plug portion 86 interferes with the locking lance 24 in a deflected state and the pushing of the retainer 80 to the full locking position is restricted. In this way, it can be detected that the female terminal 70 is left incompletely inserted in the cavity 23.

As described above, according to the first embodiment, the male terminal 50 is held in the holding portion 22 by insert molding and the tabs 52 of the male terminal 50 are arranged to project into the cavities 23 from the wall surface 32 of the holding portion 22. Thus, by properly inserting the female terminal 70 into the cavity 23, the both terminals 50, 70 are electrically connected in the housing 20. Therefore, it is not necessary to separately prepare a male housing and a female housing and the number of components can be reduced.

Further, the female terminal 70 is stopped in contact with the wall surface 32 of the holding portion 22, whereby the direct application of an insertion force of the female terminal 70 to the male terminal 50 can be avoided. Thus, the housing 20 needs not be provided with a special retaining structure for restricting the rearward escape of the male terminal 50, separately from the housing 20.

Further, by insert-molding the male terminal 50 in the housing 20, the integrity of the male terminal 50 and the housing 20 can be enhanced and the wall surface 32 of the holding portion 22 can be accurately formed into such a shape that the female terminals 70 can be stopped in contact therewith.

Further, since the sealing portion 91 is inserted, together with the plug portion 86, into the sealing space 27 of the opening 26, the entrance of water, oil and the like into the cavity 23 through the opening 26 can be prevented. Moreover, since the plug portion 86 has a retainer function of restricting the deflection of the locking lance 24, the plug portion 86 needs not be a dedicated component and is excellent in versatility.

Second Embodiment

Figure 11:
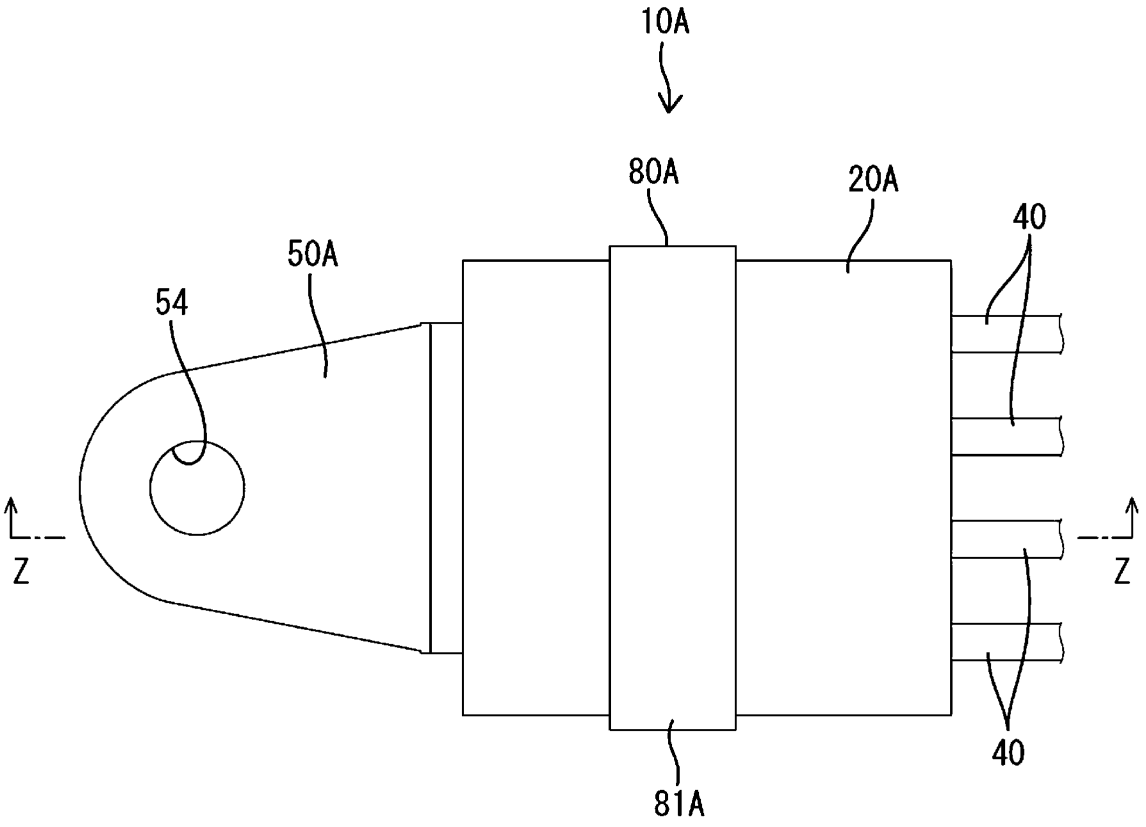
FIG. 11 is a plan view of a connector according to a second embodiment of the present disclosure when a retainer is properly mounted in a housing.

A second embodiment of the present disclosure is described with reference to FIGS. 11 and 12. A connector 10A according to the second embodiment is similar to the connector 10 according to the first embodiment, and includes a housing 20A, a male terminal 50A, female terminals 70 and a retainer 80A. Although the male terminal 50A is structured differently from the male terminal 50 of the first embodiment, a basic configuration is similar to that of the male terminal 50. In contrast, an opening 26A and the retainer 80A are largely different from the opening 26 and the retainer 80 of the first embodiment.

Figure 12:
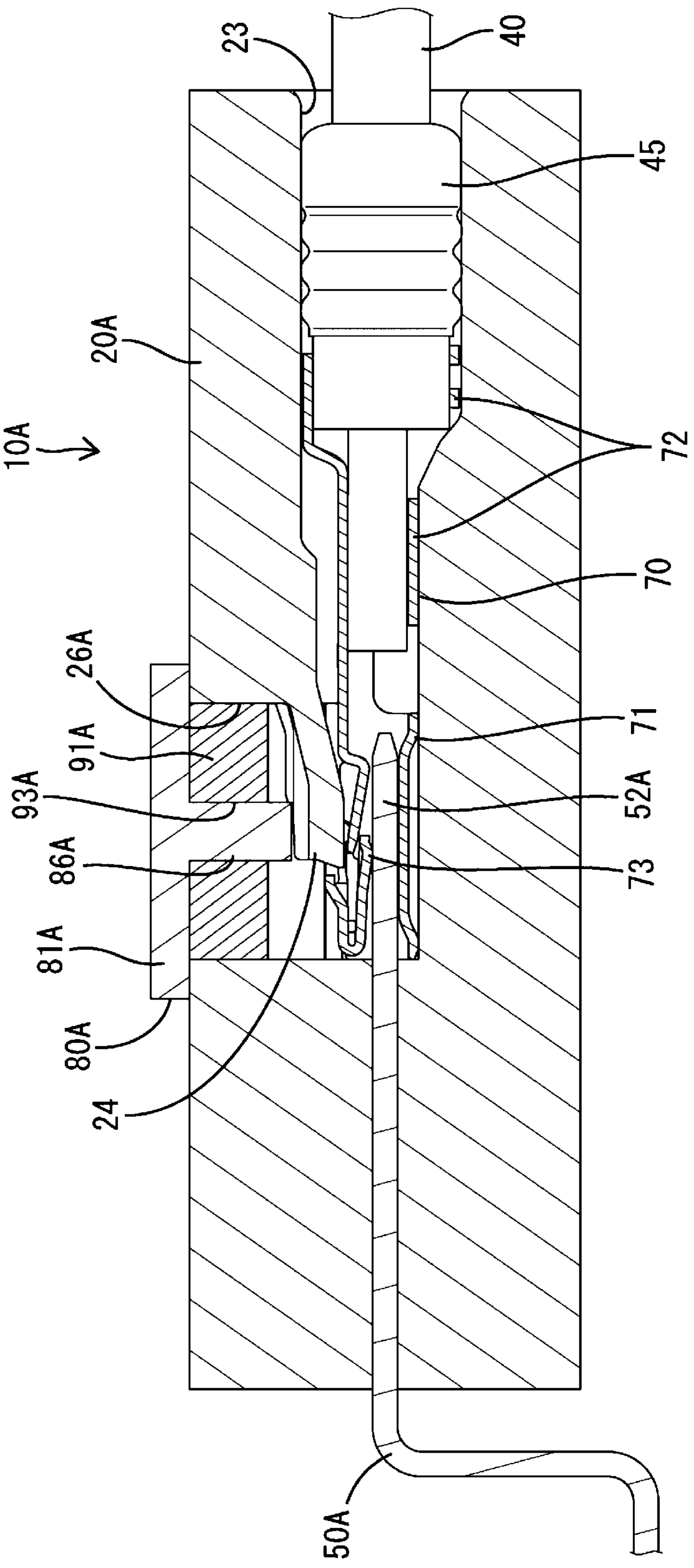
FIG. 12 is a section along Z-Z of FIG. 11.

As shown in FIG. 12, the opening 26A extends in a vertical direction orthogonal to a connecting direction of the both terminals 50A, 70 and has an upper end open in the upper surface of the housing 20A and a lower end open at a position facing locking lances 24 in the inner surfaces of cavities 23. Further, the opening 26A is open over the entire width in a lateral direction in the upper surface of the housing 20A.

The retainer 80A includes a retainer body 81A extending long in the lateral direction and plug portions 86A projecting downward from the flat lower surface of the retainer body 81A. The retainer body 81A is formed in such a size as to cover the opening 26A from above. The plug portions 86A are arranged through sealing holes 93A of sealing portions 91A in a liquid-tight manner. Note that although only one plug portion 86A is shown in FIG. 12, a plurality of the plug portions 86A are provided in the retainer 80A to corresponding to the respective locking lances 24. Further, a plurality of the sealing holes 93A are also provided in the sealing portions 91A to correspond to the respective plug portions 86A. The sealing portions 91A are in contact with the lower surface of the retainer body 81A. The sealing portions 91A are in close contact with the inner peripheral surface of the opening 26A. Thus, also in the second embodiment, the inside of the opening 26A is maintained liquid tight and the entrance of water, oil and the like into the cavities 23 through the opening 26A can be prevented as in the first embodiment.

When the female terminal 70 is properly inserted into the cavity 23, a tab 52A of the male terminal 50A held in the housing 20A by insert molding contacts a resilient contact piece 73 in a connecting portion 71 and the both terminals 50A, 70 are electrically connected in the housing 20A. Thereafter, the retainer 80A is properly inserted into the opening 26A and tip parts (lower end parts) of the plug portions 86A are arranged to be able to contact the locking lances 24. In this way, as in the first embodiment, the deflection of the locking lances 24 is restricted and the female terminals 70 are secondarily retained in the cavities 23. According to the second embodiment, the number of components can be reduced by a relatively simple structure.

Other Embodiments of Present Disclosure

The embodiments disclosed this time should be considered illustrative in all aspects, rather than restrictive.

Although the male terminal is held in the holding portion by insert molding in the case of the first and second embodiments, the male terminal may be locked to and held in the holding portion without being held by insert molding according to another embodiment. In this case, a member for restricting the escape of the male terminal may be mounted in the housing.

Although the plug portions are provided on the retainer having the retainer function of restricting the deflection of the locking lances in the case of the first and second embodiments, plug portions may be provided on an inserting member, which is inserted into the opening, but does not have the retainer function, according to another embodiment.

Although the male terminal is configured as a busbar including the plurality of tabs in the case of the first and second embodiments, a male terminal may be configured as a board terminal having a tab shape as a whole according to another embodiment.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector, comprising:
a male terminal including a tab;
a female terminal connectable to the tab; and
a housing,
wherein:
the housing includes a holding portion configured to hold the male terminal and a cavity configured to accommodate the female terminal,
one end of the cavity is closed by a wall surface of the holding portion, and
the tab is arranged to project into the cavity from the wall surface of the holding portion,
wherein the male terminal is held in the holding portion by insert molding.

2. The connector of claim 1, wherein the housing includes a locking lance projecting into the cavity to lock the female terminal and an opening penetrating from an outer surface of the housing to a position facing the locking lance, and a plug portion is arranged in the opening.

3. The connector of claim 2, comprising a sealing portion configured to seal between the plug portion and the opening.

4. The connector of claim 2, wherein the plug portion is provided on a retainer configured to restrict deflection of the locking lance.

* * * * *